United States Patent
Kojima et al.

[11] Patent Number: 5,992,607
[45] Date of Patent: Nov. 30, 1999

[54] CARD CONVEYANCE CONTROL METHOD AND APPARATUS

[75] Inventors: Susumu Kojima, Sakado; Yasuyuki Kimura, Hiki-gun, both of Japan

[73] Assignee: Kabushiki Kaisha Nippon Conlux, Tokyo, Japan

[21] Appl. No.: 08/811,573

[22] Filed: Mar. 5, 1997

[30] Foreign Application Priority Data

Mar. 6, 1996 [JP] Japan ................................. 9-049091

[51] Int. Cl.$^6$ .................................................. B65G 49/00
[52] U.S. Cl. ..................................... 198/341.05; 235/477
[58] Field of Search ................... 198/341.05, 341.08, 198/434, 468.9; 235/475, 477, 479, 486

[56] References Cited

U.S. PATENT DOCUMENTS

| | | | |
|---|---|---|---|
| 4,871,905 | 10/1989 | Mita et al. | 235/475 |
| 4,907,098 | 3/1990 | Ohkoda et al. | 360/2 |
| 4,933,537 | 6/1990 | Takahashi et al. | 235/454 |
| 4,935,916 | 6/1990 | Suzuki et al. | 369/215 |
| 5,099,111 | 3/1992 | Takakura et al. | 235/475 |
| 5,179,268 | 1/1993 | Nitto et al. | 235/454 |
| 5,189,661 | 2/1993 | Honda et al. | 369/258 |
| 5,262,629 | 11/1993 | Hayashi et al. | 235/486 |

FOREIGN PATENT DOCUMENTS

| | | |
|---|---|---|
| 289665 | 7/1990 | Japan . |
| 2138366 | 11/1990 | Japan . |
| 4311870 | 11/1992 | Japan . |
| 5067250 | 3/1993 | Japan . |
| 5174544 | 7/1993 | Japan . |
| 6349258 | 12/1994 | Japan . |

*Primary Examiner*—Janice L. Krizek
*Attorney, Agent, or Firm*—Loeb & Loeb, LLP

[57] ABSTRACT

A card conveyance control method and apparatus that allow a card held by a plurality of conveying rollers to be conveyed and securely mounted at the proper position on a conveying platform. The conveying rollers of the first conveyer unit, which holds and conveys an optical card, are rotated in the conveying direction of the optical card, and the card conveying platform of the second conveyer unit is moved in the direction of the first conveyer unit so as to press the leading edge of the optical card conveyed from the first conveyer unit against the back edge of the conveying platform; the conveying platform of the second conveyer unit is then moved in the opposite direction from the first conveyer unit while the conveying rollers of the first conveyer unit are rotated in the conveying direction of the optical card; and this operation is repeated several times.

8 Claims, 4 Drawing Sheets

CARD CONVEYANCE CONTROL METHOD AND APPARATUS

BACKGROUND OF THE INVENTION

1. Field of the Invention

This invention relates to a card conveyance control method and apparatus for conveying optical and other cards, and more particularly to a card conveyance control method and apparatus for ensuring that a card is properly mounted on a conveyer in a card conveying system comprising a first conveyer unit for conveying a card held by a plurality of conveying rollers, and a second conveyer unit that has a conveying platform for mounting thereon the card conveyed from the first conveyer unit and conveys the card by moving the conveying platform.

2. Description of the Related Art

Optical cards carrying optical recording media or cards combining such optical recording media with other recording media, such as magnetic recordings, IC (integrated circuit) recordings, or the like have recently been proposed for use as bank cards and various other cards.

Such optical cards carrying optical recording media have the following advantages:

1) the information storage capacity is much larger than that achieved with conventional magnetic cards, IC cards, or the like, and
2) it is difficult to falsify data because of its physical recording method by means of forming the recording pits on the media.

With such card reader/writer apparatus for writing and reading data onto and from such optical and other cards, it has been proposed to use a structure that comprises a first conveyer unit for conveying a card held by a plurality of conveying rollers, and a second conveyer unit equipped with a conveying platform for mounting the card conveyed from the first conveyer unit, and conveying the card by moving the platform, wherein the data can be written and read in a stable manner by being written onto or read from the card by means of an optical head or the like while the card remains mounted on the conveying platform of the second conveyer unit.

With the above-described structure for writing and reading data onto and from the card mounted on the conveying platform of the second conveyer unit, a prerequisite is that the card conveyed from the first conveyer unit is mounted at the proper position on the conveying platform of the second conveyer unit. But the conventional apparatus have the problems that it is difficult to write and read data when the card conveyed from the first conveyer unit is not mounted at the proper position on the conveying platform of the second conveyer unit.

SUMMARY OF THE INVENTION

In view of the above, an object of this invention is to provide a card conveyance control method and apparatus that allow a card, which is conveyed from a first conveyer unit after being held by a plurality of conveying rollers, to be securely mounted at a proper position on a conveying platform of a second conveyer unit.

To accomplish the stated object, this invention provides a card conveyance control method that comprises a first conveyer unit for conveying a card held by a plurality of conveying rollers, and a second conveyer unit that has a conveying platform for mounting thereon the card conveyed from the first conveyer unit and conveys the card by moving the conveying platform, wherein the conveying rollers of the first conveyer unit are rotated in the conveying direction of the card, and the conveying platform of the second conveyer unit is moved in the direction of the first conveyer unit so as to press the leading edge of the card conveyed from the first conveyer unit against the back edge of the conveying platform, and the conveying platform of the second conveyer unit is then moved in the opposite direction from the first conveyer unit.

Here, it may be arranged such that the conveying platform of the second conveyer unit is moved in the opposite direction from the first conveyer unit while the conveying rollers of the first conveyer unit are rotated in the conveying direction of the card.

Further, it may be arranged to repeat a prescribed number of times the operations in which the conveying rollers of the first conveyer unit are rotated in the conveying direction of the card, and at the same time, the conveying platform of the second conveyer unit is moved in the direction of the first conveyer unit so as to press the leading edge of the card conveyed from the first conveyer unit against the back edge of the conveying platform, and then the conveying platform of the second conveyer unit is moved in the opposite direction from the first conveyer unit while the conveying rollers of the first conveyer unit are rotated in the conveying direction of the card.

It may also be arranged to repeat a prescribed number of times the operations in which the conveying rollers of the first conveyer unit are rotated in the conveying direction of the card, and the conveying platform of the second conveyer unit is moved in the direction of the first conveyer unit so as to press the leading edge of the card conveyed from the first conveyer unit against the back edge of the conveying platform, and in which the conveying platform of the second conveyer unit is then moved in the opposite direction from the first conveyer unit while the conveying rollers of the first conveyer unit are rotated in the conveying direction of the card. And then, the conveying rollers of the first conveyer unit are subsequently stopped.

This invention also provides a card conveyance control apparatus that comprises a first conveyer unit for conveying a card held by a plurality of conveying rollers, and a second conveyer unit that has a conveying platform for mounting the card conveyed from the first conveyer unit and conveys the card by moving the conveying platform, wherein the apparatus further comprises: first drive means for rotatably driving the conveying rollers of the first conveyer unit; second drive means for movably driving the conveying platform of the second conveyer unit; and control means for controlling the first drive means to rotate the conveying rollers of the first conveyer unit in the conveying direction of the card and controlling the second drive means to move the conveying platform of the second conveyer unit in the direction of the first conveyer unit so as to press the leading edge of the card conveyed from the first conveyer unit against the back edge of the conveying platform, and for subsequently moving the conveying platform of the second conveyer unit by the second drive means in the opposite direction from the first conveyer unit.

Here, it may be arranged such that the control means controls the second drive means to move the conveying platform of the second conveyer unit in the opposite direction from the first conveyer unit while the conveying rollers of the first conveyer unit are rotated by the first drive means in the conveying direction of the card.

Further, the control means can be arranged to involve repeating a prescribed number of times the control routines in which the first drive means is controlled to rotate the conveying rollers of the first conveyer unit in the conveying direction of the card, and the second drive means is controlled to move the conveying platform of the second conveyer unit in the direction of the first conveyer unit so as to press the leading edge of the card conveyed from the first conveyer unit against the back edge of the conveying platform, and in which the conveying platform of the second conveyer unit is then moved by the second drive means in the opposite direction from the first conveyer unit while the conveying rollers of the first conveyer unit are rotated by the first drive means in the conveying direction of the card.

The control means can also be arranged to involve repeating a prescribed number of times the control routines in which the first drive means is controlled to rotate the conveying rollers of the first conveyer unit in the conveying direction of the card, and the second drive means is controlled to move the conveying platform of the second conveyer unit in the direction of the first conveyer unit so as to press the leading edge of the card conveyed from the first conveyer unit against the back edge of the conveying platform, and in which the conveying platform of the second conveyer unit is then moved by the second drive means in the opposite direction from the first conveyer unit while the conveying rollers of the first conveyer unit are rotated by the first drive means in the conveying direction of the card; and to subsequently control the first drive means to stop the conveying rollers of the first conveyer unit.

According to this invention, the conveying rollers of the first conveyer unit are rotated in the conveying direction of the card and the conveying platform of the second conveyer unit is moved in the direction of the first conveyer unit so as to press the leading edge of the card conveyed from the first conveyer unit against the back edge of the conveying platform, and the conveying platform of the second conveyer unit is then moved in the opposite direction from the first conveyer unit, making it possible to securely mount the card at the proper position on the conveying platform and to accurately write and read data onto and from the card.

DESCRIPTION OF THE PREFERRED EMBODIMENTS

An embodiment of the card conveyance control method and apparatus pertaining to this invention will now be described in detail with reference to the accompanying drawings.

Figure 1:
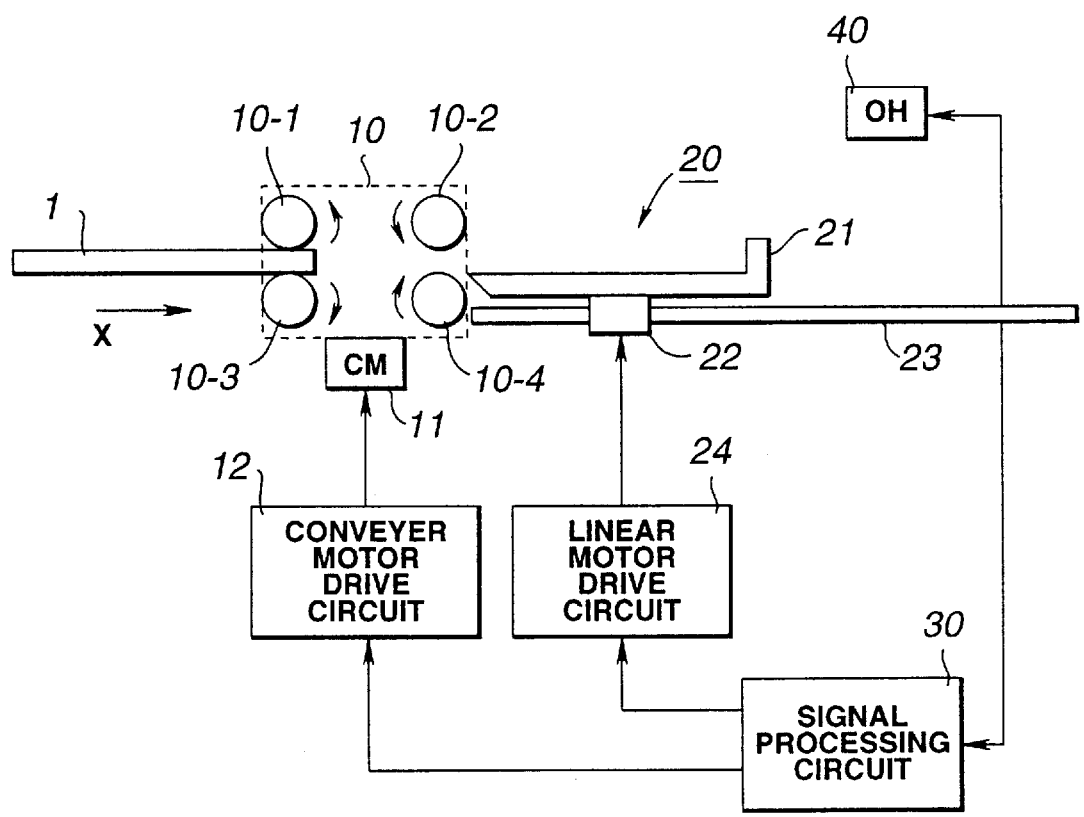
FIG. 1 is a block diagram showing the general structure of a control system for a card reader/writer apparatus configured using the card conveyance control method and apparatus pertaining to this invention.

FIG. 1 is a block diagram showing the general structure of the control system for a card reader/writer apparatus configured using the card conveyance control method and apparatus pertaining to this invention.

The card reader/writer, which uses an optical head 40 to write and read data onto and from an optical card 1 carrying an optical recording medium, comprises a first conveyer unit (roller conveyer unit) 10 in which a plurality of conveying rollers 10-1 through 10-4 hold and convey an optical card 1 inserted into a card slot (not shown), and a second conveyer unit 20 for mounting and conveying the optical card 1 on a card conveying platform 21 after the card had been conveyed from the first conveyer unit 10, wherein the optical head 40 is used to write and read data onto and from the optical recording medium carried by the optical card 1 while the optical card 1 remains mounted on the card conveying platform 21 of the second conveyer unit 20.

Here, the reason why the data are written and read while the optical card 1 remains mounted on the card conveying platform 21 is that it is easy to accurately control the positions of the optical head 40 and the optical recording medium on the optical card 1, making it possible to write and read data onto and from each data track of an optical recording medium in which numerous (for example, about 2500) data tracks are formed.

The plurality of conveying rollers 10-1 through 10-4 of the first conveyer unit 10 are driven by a conveyer motor (CM) 11 by means of a belt or the like (not shown), and the optical card 1 is conveyed in the X-direction by rotating the conveying rollers 10-1 through 10-4, in the directions shown by the arrows. The conveyer motor (CM) 11 is energized and controlled by a conveyer motor drive circuit 12.

The card conveying platform 21 of the second conveyer unit 20 is equipped with linear motors (LM) 22, and the optical card 1 mounted on the card conveying platform 21 is moved in the X-direction by the movement of the linear motors (LM) 22 along X-direction guides 23. The linear motors (LM) 22 are energized and controlled by a linear motor drive circuit 24.

The optical head 40 is equipped with Y-direction drive linear motors that move along a Y-direction guide (not shown), and the optical head 40 is moved and controlled in the direction (Y-direction) perpendicular to the plane of paper of FIG. 1 by the Y-direction drive linear motors. The data tracks of the optical recording medium on the optical card 1 are selected and controlled by the controlled movement of the optical head 40 in the Y-direction.

A signal processing circuit 30, which processes the various signals of the card reader/writer, performs, for example, the following operations:

1) controlling the conveyer motor (CM) 11, 2) controlling the linear motors (LM) 22, 3) writing and reading data by the optical head 40, and 4) moving the optical head 40 in the Y-direction.

When an optical card 1 is inserted into the card slot (not shown) in this structure, the signal processing circuit 30 controls the conveyer motor drive circuit 12 to reverse the rotation of the conveyer motor (CM) 11 and to rotate the conveying rollers 10-1 through 10-4 of the first conveyer unit 10 in the directions shown in arrows in FIG. 1 (which will hereinafter be referred to as "normal rotation"), thus conveying the inserted optical card 1 in the X-direction.

In addition, the signal processing circuit 30 controls the linear motor drive circuit 24 to energize the linear motors (LM) 22 of the second conveyer unit 20, to move the card conveying platform 21 in the direction (reverse direction with respect to the X-direction) of the first conveyer unit 10, and to bring the card conveying platform 21 into contact with the card conveying port of the first conveyer unit 10 shown in FIG. 1.

As a result, the normal rotation of the conveying rollers 10-1 through 10-4 of the first conveyer unit 10 guides the optical card 1 conveyed from the card conveying port of the first conveyer unit 10 onto the card conveying platform 21 of the second conveyer unit 20.

Figure 2:
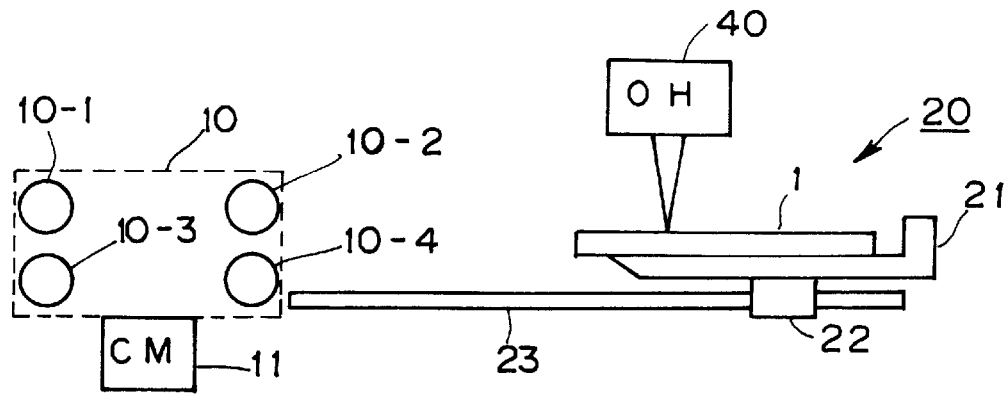
FIG. 2 is a diagram illustrating the operation of the card reader/writer apparatus shown in FIG. 1.

Once the optical card 1 has been conveyed from the card conveying port of the first conveyer unit 10 onto the card conveying platform 21 of the second conveyer unit 20, the signal processing circuit 30 controls the linear motor drive circuit 24 to energize the linear motors (LM) 22 of the second conveyer unit 20 and to move the card conveying platform 21 in the reverse direction (X-direction) with respect to the first conveyer unit 10, and when the optical card 1 on the card conveying platform 21 reaches the position underneath the optical head 40, as shown in FIG. 2, data are written and read by the optical head 40 onto and from the optical recording medium carried by the optical card 1.

Here, a so-called physical recording means, in which recording pits are formed in the data tracks of an optical recording medium, is adopted in order to write data onto the optical recording medium of the optical card 1 by means of the optical head 40, and a technique in which the aforementioned recording pits are optically read by the optical head 40 is adopted in order to read the data.

The linear motors (LM) 22 shown in FIG. 1 are used to move the optical head 40 in the direction (X-direction) of the data tracks with respect to the optical recording medium of the optical card 1, and Y-direction drive linear motors (not shown) mounted on the optical head 40 are used to select the data tracks, that is, to move the optical head 40 in the direction (Y-direction) perpendicular to the data tracks on the optical recording medium of the optical card 1.

Figure 3:
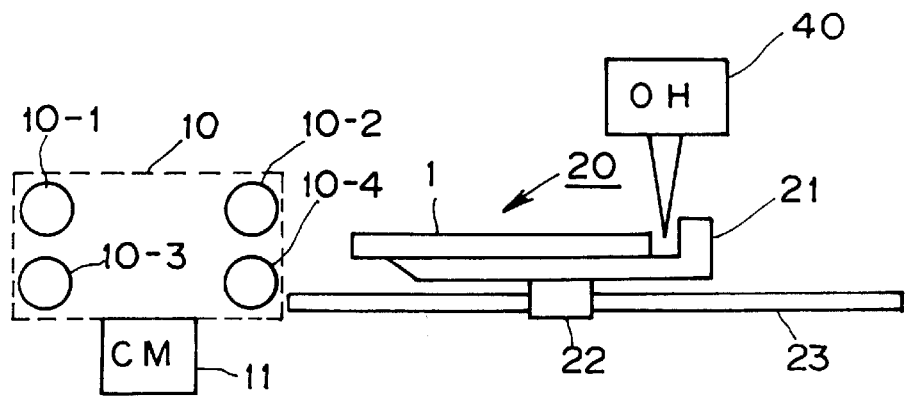
FIG. 3 is a diagram illustrating the operation of the card reader/writer apparatus shown in FIG. 1.

Here, the optical head 40 is not focused on the leading edge of the optical card 1 (as shown in FIG. 3) if the optical card 1 is not mounted properly on the card conveying platform 21 of the second conveyer unit 20, as shown in FIG. 2. In this case, the signal processing circuit 30 of this embodiment detects the fact that the optical card 1 has not been properly mounted on the card conveying platform 21 of the second conveyer unit 20.

Once it has determined that the optical card 1 has not been properly mounted on the card conveying platform 21 of the second conveyer unit 20, the signal processing circuit 30 performs a card remounting routine for moving the optical card 1 and mounting it at the proper position on the card conveying platform 21 of the second conveyer unit 20 because data cannot be written or read correctly onto or from the optical card 1 if its improper position is not changed.

Figure 4:
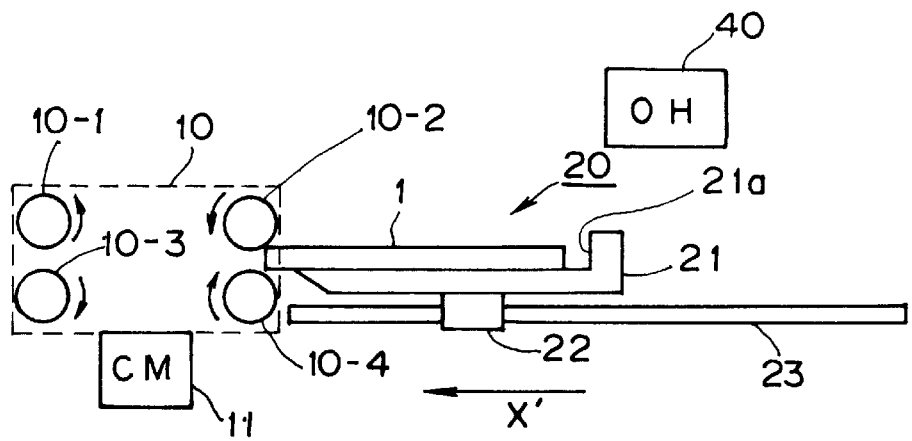
FIG. 4 is a diagram illustrating the operation of the card reader/writer apparatus shown in FIG. 1.

Specifically, as shown in FIG. 4, the signal processing circuit 30 controls the conveyer motor drive circuit 12 to normally rotate the conveyer motor (CM) 11 and to rotate the conveying rollers 10-1 through 10-4 of the first conveyer unit 10 in the directions of the arrows in FIG. 4 (direction of normal rotation), and at the same time controls the linear motor drive circuit 24 to energize the linear motors (LM) 22 of the second conveyer unit 20 and to move the card conveying platform 21 in the direction of the first conveyer unit 10 (in reverse direction with respect to the X-direction, that is, in the X'-direction), whereby the leading edge of the optical card 1 is pressed against the stopper 21a of the card conveying platform 21 of the second conveyer unit 20, the card conveying platform 21 is then moved in the reverse direction (X-direction) with respect to the first conveyer unit 10, and this operation is repeated several (for example, three) times.

Figure 5:
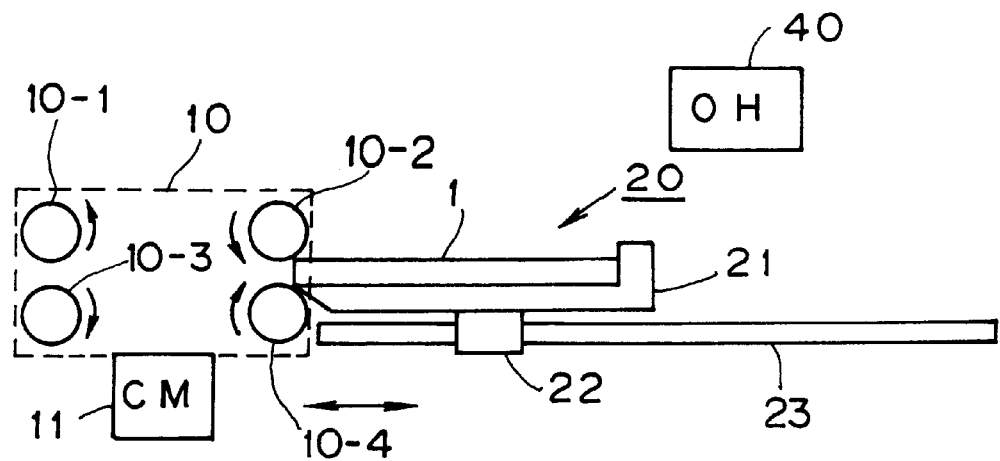
FIG. 5 is a diagram illustrating the operation of the card reader/writer apparatus shown in FIG. 1.

The optical card 1 is thereby remounted at the proper position on the card conveying platform 21 of the second conveyer unit 20, as shown in FIG. 5.

Figure 6:
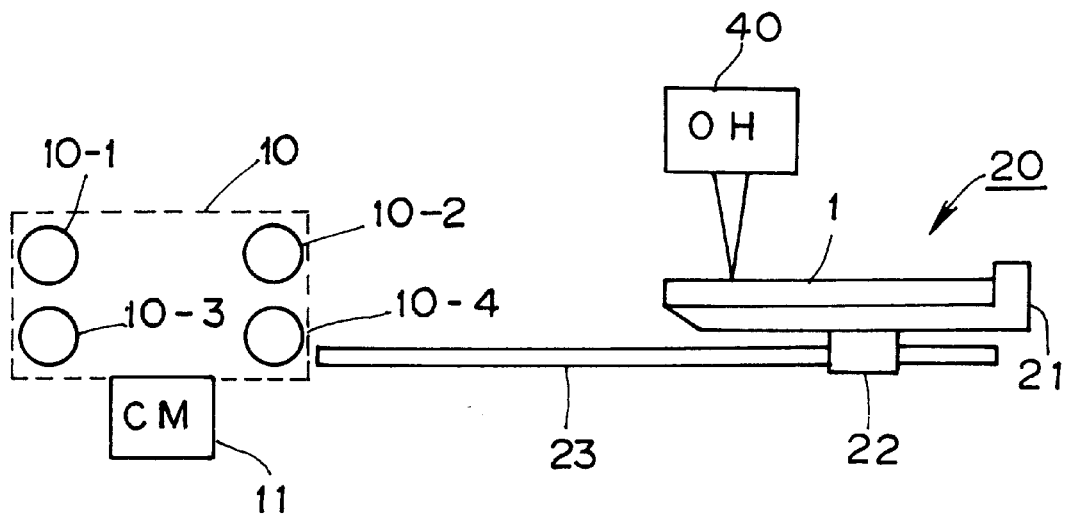
FIG. 6 is a diagram illustrating the operation of the card reader/writer apparatus shown in FIG. 1.

The signal processing circuit 30 then controls the linear motor drive circuit 24 to energize the linear motors (LM) 22 of the second conveyer unit 20 and to move the card conveying platform 21 in the reverse direction (X-direction) with respect to the first conveyer unit 10, and when the optical card 1 on the card conveying platform 21 has reached the position underneath the optical head 40, as shown in FIG. 6, data are again written and read by the optical head 40 onto and from the optical recording medium carried by the optical card 1.

With such a structure, even when the optical card 1 is not mounted properly on the card conveying platform 21 of the second conveyer unit 20, the optical card 1 can be remounted in its proper position on the card conveying platform 21 of the second conveyer unit 20, and data can be written or read accurately onto or from the optical card 1.

Figure 7:
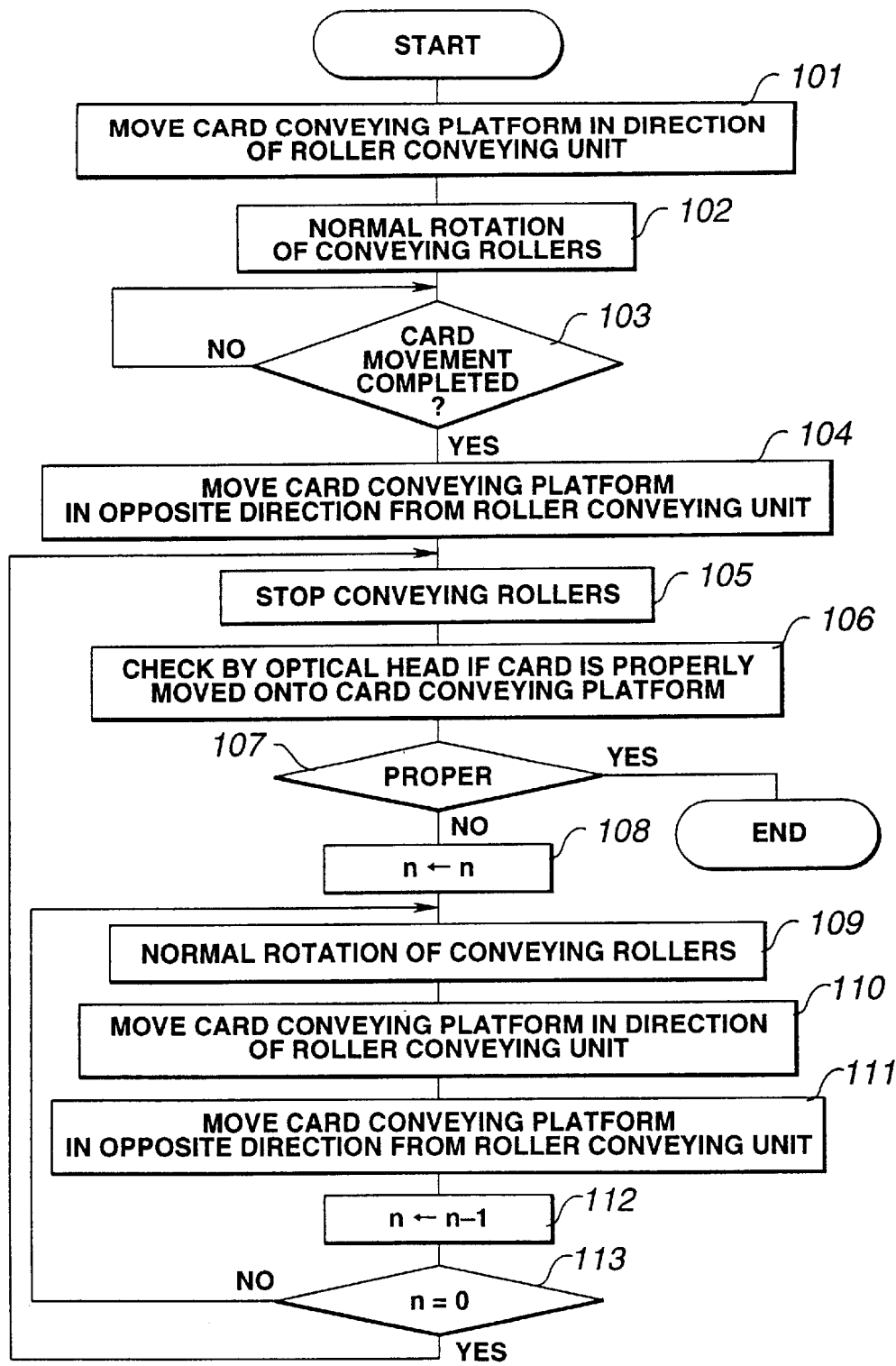
FIG. 7 is a flow chart illustrating an optical card remounting routine of the card reader/writer apparatus shown in FIG. 1.

FIG. 7 shows, in the form of a flow chart, the routine for remounting the aforementioned optical card 1.

In FIG. 7, the signal processing circuit 30 first controls the linear motor drive circuit 24 to energize the linear motors (LM) 22 of the second conveyer unit 20 and to move the card conveying platform 21 in the direction of the roller conveyer unit (first conveyer unit 10) (step 101).

The signal processing circuit 30 then controls the conveyer motor drive circuit 12 to normally rotate the conveyer motor (CM) 11 and to normally rotate the conveying rollers (conveying rollers 10-1 through 10-4) of the first conveyer unit 10, that is, to rotate the rollers in the directions of the arrows in FIG. 1 (step 102).

It is subsequently determined whether the movement of the card has been completed properly by the routines performed during the aforementioned steps 101 and 102, that is, whether the optical card 1 conveyed from the card conveying port of the first conveyer unit 10 by the normal rotation of the conveying rollers 10-1 through 10-4 of the first conveyer unit 10 has been guided properly on the card conveying platform 21 of the second conveyer unit 20 (step 103).

Here, if the movement of the card has been completed (YES in step 103), the signal processing circuit 30 controls the linear motor drive circuit 24 to energize the linear motors (LM) 22 of the second conveyer unit 20 and to move (step 104) the card conveying platform 21 in the opposite direction (X-direction) from the roller conveyer unit (first conveyer unit 10), and the signal processing circuit 30 subsequently controls the conveyer motor drive circuit 12 to stop the conveyer motor (CM) 11 and to stop the conveying rollers, that is, the conveying rollers 10-1 through 10-4 of the first conveyer unit 10 (step 105).

When the optical card 1 has reached the position underneath the optical head 40 as a result of the movement of the card conveying platform 21 of the second conveyer unit 20, it is checked whether the optical card 1 has been properly mounted on the card conveying platform 21 of the second conveyer unit 20 by accessing the optical recording medium of the optical card 1 with the optical head 40 (step 106).

The checking can be made by determining whether the optical head 40 is focused on the data tracks of the optical recording medium of the optical card 1.

Based on the checking performed in step 106, it is subsequently determined whether the detection results indicate that the optical card 1 has been properly mounted on the card conveying platform 21 of the second conveyer unit 20 (step 107).

If it is detected in this case that the optical card 1 has not been properly mounted on the card conveying platform 21 of the second conveyer unit 20 (NO in step 107), a counter (not shown) is set to an n-value (step 108), and the conveyer motor drive circuit 12 is controlled to normally rotate the conveyer motor (CM) 11 and to normally rotate the conveying rollers 10-1 through 10-4 of the first conveyer unit 10, that is, to rotate the rollers in the directions of the arrows in FIG. 1 (step 109).

The linear motor drive circuit 24 is subsequently controlled to energize the linear motors (LM) 22 of the second conveyer unit 20, to move the card conveying platform 21 in the direction of the roller conveyer unit (first conveyer unit 10) (step 110), and to press the leading edge of the optical card 1 against the stopper 21a of the card conveying platform 21 of the second conveyer unit 20.

The linear motor drive circuit 24 is then controlled to energize the linear motors (LM) 22 of the second conveyer unit 20 and to move the card conveying platform 21 in the opposite direction (X-direction) from the roller conveyer unit (first conveyer unit 10) (step 111).

"1" is subsequently subtracted from the n-value in the counter (not shown), and the remainder is set as the new n-value for the counter (not shown) (step 112), and then it is determined whether the n-value of the counter (not shown) is zero (step 113).

If the n-value of the counter (not shown) is not zero in this case (NO in step 113), the operation returns to step 109, and the routines from step 109 to step 113 are repeated.

If it is determined during step 113 that the n-value of the counter (not shown) is zero, that is, if the routines from step 109 to step 113 have been repeated n times (YES in step 113), the operation returns to step 105 and the conveying rollers, that is, the conveying rollers 10-1 through 10-4, are stopped and when the optical card 1 has reached the position underneath the optical head 40, it is checked whether the optical card 1 has been properly mounted on the card conveying platform 21 of the second conveyer unit 20 by accessing the optical recording medium of the optical card 1 with the optical head 40 (step 106).

The routine for remounting the optical card 1 is completed if it is determined during step 107 that the optical card 1 has been properly mounted on the card conveying platform 21 of the second conveyer unit 20 (YES in step 107).

If it is determined during step 107 that the optical card 1 has not been properly mounted on the card conveying platform 21 of the second conveyer unit 20 (NO in step 107), the flow chart can be so composed as to repeat the routines from step 108 to step 113 or to employ a procedure in which, for example, a malfunction is indicated and the operation is aborted without repeating the routines from step 108 to step 113 or after the routines from step 108 to step 113 have been repeated a set number of times.

What is claimed is:

1. A card conveyance control method, using a first conveyer unit for conveying a card held by a plurality of conveying rollers; and a second conveyer unit that has a conveying platform for mounting the card conveyed from the first conveyer unit and that conveys the card by moving the conveying platform, wherein the card conveyance control method comprises the steps of:

rotating the conveying rollers of the first conveyer unit in the conveying direction of the card and simultaneously moving the conveying platform of the second conveyer unit in the direction of the first conveyer unit so as to press a leading edge of the card conveyed from the first conveyer unit against a back edge of the conveying platform; and subsequently moving the conveying platform of the second conveyer unit in the opposite direction from the first conveyer unit.

2. A card conveyance control method as defined in claim 1, wherein the conveying platform of the second conveyer unit is moved in the opposite direction from the first conveyer unit while the conveying rollers of the first conveyer unit are rotated in the conveying direction of the card.

3. A card conveyance control method as defined in claim 1, further comprising a step of:

repeating a prescribed number of times operations in which the conveying rollers of the first conveyer unit are rotated in the conveying direction of the card and the conveying platform of the second conveyer unit is moved in the direction of the first conveyer unit so as to press the leading edge of the card conveyed from the first conveyer unit against the back edge of the conveying platform, and in which the conveying platform of the second conveyer unit is then moved in the opposite direction from the first conveyer unit while the conveying rollers of the first conveyer unit are rotated in the conveying direction of the card.

4. A card conveyance control method as defined in claim 1, further comprising the steps of:

repeating a prescribed number of times operations in which the conveying rollers of the first conveyer unit are rotated in the conveying direction of the card and the conveying platform of the second conveyer unit is moved in the direction of the first conveyer unit so as to press the leading edge of the card conveyed from the first conveyer unit against the back edge of the conveying platform, and in which the conveying platform of the second conveyer unit is then moved in the opposite direction from the first conveyer unit while the conveying rollers of the first conveyer unit are rotated in the conveying direction of the card; and subsequently stopping the conveying rollers of the first conveyer unit.

5. A card conveyance control apparatus, having a first conveyer unit for conveying a card held by a plurality of conveying rollers; and a second conveyer unit that has a conveying platform for mounting the card conveyed from the first conveyer unit and that conveys the card by moving the conveying platform, wherein the card conveyance control apparatus comprises:

first drive means for driving rotation of the conveying rollers of the first conveyer unit;

second drive means for driving movement of the conveying platform of the second conveyer unit; and control means for controlling the first drive means to rotate the conveying rollers of the first conveyer unit in the conveying direction of the card and controlling the second drive means to simultaneously move the conveying platform of the second conveyer unit in the direction of the first conveyer unit so as to press a leading edge of the card conveyed from the first conveyer unit against a back edge of the conveying platform, and for subsequently moving the conveying platform of the second conveyer unit by the second drive means in the opposite direction from the first conveyer unit.

6. A card conveyance control apparatus as defined in claim 5, wherein the control means controls the second drive means to move the conveying platform of the second conveyer unit in the opposite direction from the first conveyer unit while the conveying rollers of the first conveyer unit are rotated by the first drive means in the conveying direction of the card.

7. A card conveyance control apparatus as defined in claim 5, wherein the control means repeats a prescribed number of times control routines in which the first drive means is controlled to rotate the conveying rollers of the first conveyer unit in the conveying direction of the card, and the second drive means is controlled to move the conveying platform of the second conveyer unit in the direction of the first conveyer unit so as to press the leading edge of the card conveyed from the first conveyer unit against the back edge of the conveying platform, and in which the conveying platform of the second conveyer unit is then moved by the second drive means in the opposite direction from the first conveyer unit while the conveying rollers of the first conveyer unit are rotated by the first drive means in the conveying direction of the card.

8. A card conveyance control apparatus as defined in claim 5, wherein the control means repeats a prescribed number of times control routines in which the first drive means is controlled to rotate the conveying rollers of the first conveyer unit in the conveying direction of the card, and the second drive means is controlled to move the conveying platform of the second conveyer unit in the direction of the first conveyer unit so as to press the leading edge of the card conveyed from the first conveyer unit against the back edge of the conveying platform, and in which the conveying platform of the second conveyer unit is then moved by the second drive means in the opposite direction from the first conveyer unit while the conveying rollers of the first conveyer unit are rotated by the first drive means in the conveying direction of the card; and subsequently controls the first drive means to stop the conveying rollers of the first conveyer unit.

* * * * *